United States Patent
Matsuno et al.

(10) Patent No.: US 7,373,236 B2
(45) Date of Patent: May 13, 2008

(54) VEHICLE CONTROL DEVICE AND VEHICLE CONTROL METHOD

(75) Inventors: Koji Matsuno, Tokyo (JP); Masaru Kogure, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 880 days.

(21) Appl. No.: 10/864,820

(22) Filed: Jun. 10, 2004

(65) Prior Publication Data

US 2004/0267429 A1  Dec. 30, 2004

(30) Foreign Application Priority Data

Jun. 11, 2003  (JP) .............................. 2003-166821

(51) Int. Cl.
  *G05D 1/00* (2006.01)
(52) U.S. Cl. .......................................... 701/80; 701/91
(58) Field of Classification Search ............ 701/69–91; 303/146–150; 180/107
  See application file for complete search history.

(56) References Cited

U.S. PATENT DOCUMENTS

| 7,113,858 B2 * | 9/2006 | Miyazaki ....................... 701/71 |
| 7,191,047 B2 * | 3/2007 | Chen et al. .................... 701/70 |
| 7,264,077 B2 * | 9/2007 | Mori et al. ................... 180/233 |
| 2002/0109402 A1 | 8/2002 | Nakamura | |

FOREIGN PATENT DOCUMENTS

| DE | 39 35 588 A1 | 4/1991 |
| EP | 1 197 409 A2 | 4/2002 |
| EP | 1 197 409 A3 | 2/2003 |
| JP | 62-275814 | 11/1987 |
| JP | 4-331336 | 11/1992 |
| JP | 8-2274 | 1/1996 |
| JP | 3132190 | 11/2000 |
| WO | WO 99/19192 | 4/1999 |

OTHER PUBLICATIONS

European Search Report dated Oct. 6, 2004.

* cited by examiner

*Primary Examiner*—Richard M. Camby
(74) *Attorney, Agent, or Firm*—McGinn IP Law Group, PLLC (57) ABSTRACT

Steering stability of a vehicle under a traveling state such as cornering is enhanced by controlling a state of the vehicle based on cornering powers of right and left wheels. A detecting unit 1 detects action force containing longitudinal force Fx, lateral force Fy and vertical force Fz which act on each wheel. A specifying unit 2 specifies a friction coefficient between the wheels and road surface. An estimating unit 6 estimates cornering power ka of each wheel based on the action force and the friction coefficient. A processing unit 7 determines control values so that the representative value ka_ave of the cornering powers concerning the right and left wheels is larger than the present value of the representative value ka_ave of the cornering powers concerning the right and left wheels. Controlling units 8 to 10 control the state of the vehicle based on the control values thus determined.

30 Claims, 5 Drawing Sheets

VEHICLE CONTROL DEVICE AND VEHICLE CONTROL METHOD

BACKGROUND OF THE INVENTION

1. Field of the Invention

The present invention relates to a vehicle control device and a vehicle control method for controlling a motion state of a vehicle, and particularly to control of the state of the vehicle based on the cornering power of wheels.

2. Description of the Related Art

There has been hitherto known a vehicle control method of controlling a motion state of a vehicle by controlling a driving/braking torque applied to the vehicle or controlling a suspension characteristic of the vehicle. According to this vehicle control method, for example, the motion state is controlled to be optimized under a traveling state such as cornering, thereby enhancing steering stability. As one of these techniques is known a vehicle control device for controlling the motion state of a vehicle by using a wheel frictional force utilization factor (for example, see Japanese Examined Patent Application No. 3132190). This vehicle control device determines the vehicle frictional force utilization factor for each wheel, and controls a wheel state of each wheel so that the vehicle frictional force utilization factor approaches a target vehicle frictional force utilization factor. The wheel frictional force utilization factor is calculated as a rate of the actual frictional force (a resultant force of a longitudinal force and a lateral force that actually occurs between the wheels and road surface) to the maximum frictional force (a product of an actual friction coefficient between the wheels and the road surface and vertical force actually occurring between the wheels and the road surface).

The inventor has found that it is preferable to pay attention to cornering power of wheels in order to effectively control the motion state of a vehicle under a traveling state (for example, cornering, traveling on road surface with a low friction coefficient, etc.) to which the above-described vehicle control is effective. This is because the cornering power indicates response of variation of the behavior of the vehicle (cornering force) in accordance with the magnitude of the value thereof, and thus it is a value having close relationship with the motion state of the vehicle. Accordingly, the steering stability of the vehicle can be estimated on the basis of the cornering power. For instance, formulation (for example, static margin, stability factor, etc.) is generally carried out using cornering power in steering stability analysis or vehicle motion control using a vehicle motion model considering only two degrees of freedom (the model considering the translation motion in the lateral direction and the rotational motion around the vertical axis).

The method disclosed in the Japanese Examined Patent Application No. 3132190 enhances the motion state of the vehicle by bringing the vehicle frictional force utilization factor closer to the target frictional force utilization factor. However, focusing on the cornering power of the wheels, there is a probability that the cornering power of the wheels has an improper value for each wheel even when the vehicle frictional force utilization factor of the wheels approaches the target friction utilizing factor. For example, the controllability of the vehicle may be lost when the wheel cornering power is reduced.

SUMMARY OF THE INVENTION

The present invention has been implemented in view of the foregoing situation, and has an object to provide a novel vehicle control method.

Another object of the present invention is to enhance the steering stability of a vehicle under a running state such as cornering by controlling the state of the vehicle based on the cornering power of the right and left wheels.

In order to solve such problems, a first invention provides a vehicle control device for controlling a motion state of a vehicle, including a detecting unit, a specifying unit, an estimating unit, a processing unit and a controlling unit. In this vehicle control device, the detecting unit detects action force containing longitudinal force, lateral force and vertical force acting on a wheel. The specifying unit specifies a friction coefficient between the wheel and surface of a road. The estimating unit estimates cornering power of each of right and left wheels based on the detected action force and the specified friction coefficient. The processing unit determines a first control value so that a representative value of the cornering power concerning the right and left wheels which is calculated on the basis of the cornering power thus estimated is larger than a present value of the representative value of the cornering power concerning the right and left wheels. The controlling unit controls a state of the vehicle based on the first control value thus determined.

A second invention provides a vehicle control device for controlling a motion state of a vehicle, including a detecting unit, a specifying unit, an estimating unit, a processing unit and a controlling unit. The detecting unit detects action force containing longitudinal force, lateral force and vertical force acting on a wheel. The specifying unit specifies a friction coefficient between the wheels and surface of a road. The estimating unit estimates cornering power of each of right and left wheels based on the detected action force and the specified friction coefficient. The processing unit calculates a variation rate of the cornering power according to the action force on the basis of the estimated cornering power for each of the right and left wheels, and determines a first control value based on the calculated variation rate concerning the right and left wheels so that a variation rate concerning the left wheel and a variation rate concerning the right wheel approach to each other. The controlling unit controls a state of the vehicle based on the first control value.

In the second invention, it is preferred that the processing unit calculates as the variation rate the variation rate of the cornering power based on the longitudinal force, and compares the calculated variation rates concerning the right and left wheels with each other to determine a longitudinal force distribution ratio to the right and left wheels as the first control value so that the longitudinal force acting on one wheel of the right and left wheels decreases and the longitudinal force acting on the other wheel increases. It is also preferred that the controlling unit controls at least one of a driving force distribution ratio and braking force distribution ratio to the right and left wheels so that the longitudinal force acting on the wheels satisfies the longitudinal force distribution ratio thus determined. In this case, the variation rate concerning the one wheel is preferably smaller than the variation rate concerning the other wheel.

Additionally, in the second invention, it is preferred that the processing unit calculates as the variation rate the variation rate of the cornering power based on the vertical force, and compares the calculated variation rates concerning the right and left wheels to determine a vertical force distribution ratio to the right and left wheels as the first control value so that the vertical force acting on one wheel of the right and left wheels decreases and the vertical force acting on the other wheel increases. It is also preferred that the controlling unit controls a vertical load distribution ratio to the right and left wheels so that the vertical force acting on the wheels satisfies the vertical force distribution ratio thus determined. In this case, the variation rate concerning the one wheel is preferably larger than the variation rate concerning the other wheel.

Additionally, in the first and the second inventions, the processing unit may further determine a second control value so that a stability factor of the vehicle approaches a target stability factor. The controlling unit may further control the state of the vehicle based on the second control value thus determined. In this case, it is preferred that the processing unit determines the longitudinal force distribution ratio to front and rear wheels as the second control value, and the controlling unit further controls at least one of a driving force distribution ratio and braking force distribution ratio to the front and rear wheels so that the longitudinal force acting on the wheels satisfies the longitudinal force distribution ratio thus determined. Alternatively, it is preferred that the processing unit determines an vertical force distribution ratio to the front and rear wheels as the second control value, and the controlling unit further controls a vertical load distribution ratio to the front and rear wheels so that the vertical force acting on the wheels satisfies the vertical force distribution ratio thus determined.

A third invention provides a vehicle control method for controlling a motion state of a vehicle, including a first step of estimating cornering power of each of right and left wheels based on action force containing longitudinal force, lateral force and vertical force acting on a wheel and a friction coefficient between the wheel and surface of a road, a second step of determining a first control value so that a representative value of the cornering power concerning the right and left wheels which is calculated on the basis of the cornering power thus estimated is larger than a present value of the representative value of the cornering power concerning the right and left wheels, and a third step of controlling a state of the vehicle based on the first control value thus determined.

A fourth invention provides a vehicle control method for controlling a motion state of a vehicle, including a first step of estimating cornering power of each of right and left wheels based on action force containing longitudinal force, lateral force and vertical force acting on a wheel and a friction coefficient between the wheels and surface of a road, a second step of calculating a variation rate of the cornering power according to the action force based on the estimated cornering power for each of the right and left wheels, and determining a first control value based on the calculated variation rate concerning the right and left wheels so that a variation rate concerning the left wheel and a variation rate concerning the right wheel approach to each other, and a third step of controlling a state of the vehicle based on the first control value thus determined.

In the fourth invention, it is preferred that the second step includes steps of calculating as the variation rate the variation rate of the cornering power based on the longitudinal force, and comparing the calculated variation rates concerning the right and left wheels with each other to determine a longitudinal force distribution rate to the right and left wheels as the first control value so that the longitudinal force acting on one wheel of the right and left wheel decreases and the longitudinal force acting on the other wheel increases. It is also preferred that the third step includes steps of controlling at least one of a driving force distribution ratio and braking force distribution ratio to the right and left wheels so that the longitudinal force acting on the wheels satisfies the longitudinal force distribution ratio thus determined. In this case, the variation rate concerning the one wheel is preferably smaller than the variation rate concerning the other wheel.

Additionally, in the fourth invention, it is preferred that the second step includes steps of calculating as the variation rate the variation rate of the cornering power based on the vertical force, and comparing the calculated variation rates concerning the right and left wheels to determine a vertical force distribution ratio to the right and left wheels as the first control value so that the vertical force acting on one wheel of the right and left wheels decreases and the vertical force acting on the other wheel increases. It is also preferred that the third step includes steps of controlling a vertical load distribution ratio to the right and left wheels so that the vertical force acting on the wheels satisfies the vertical force distribution ratio thus determined. In this case, the variation rate concerning the one wheel is preferably larger than the variation rate concerning the other wheel.

Additionally, in the third and fourth inventions, the second step may further include a fourth step of determining a second control value so that a stability factor of the vehicle approaches a target stability factor. The third step may further include a fifth step of controlling the state of the vehicle based on the second control value thus determined. In this case, it is preferred that the fourth step includes a step of determining the longitudinal force distribution ratio to front and rear wheels as the second control value, and the fifth step includes a step of controlling at least one of a driving force distribution ratio and braking force distribution ratio to the front and rear wheels so that the longitudinal force acting on the wheels satisfies the longitudinal force distribution ratio thus determined. Alternatively, it is preferred that the fourth step includes a step of determining a vertical force distribution ratio to the front and rear wheels as the second control value, and the fifth step includes a step of controlling a vertical load distribution ratio to the front and rear wheels so that the vertical force acting on the wheels satisfies the vertical force distribution ratio thus determined.

DESCRIPTION OF PREFERRED EMBODIMENT

First Embodiment

Figure 1:
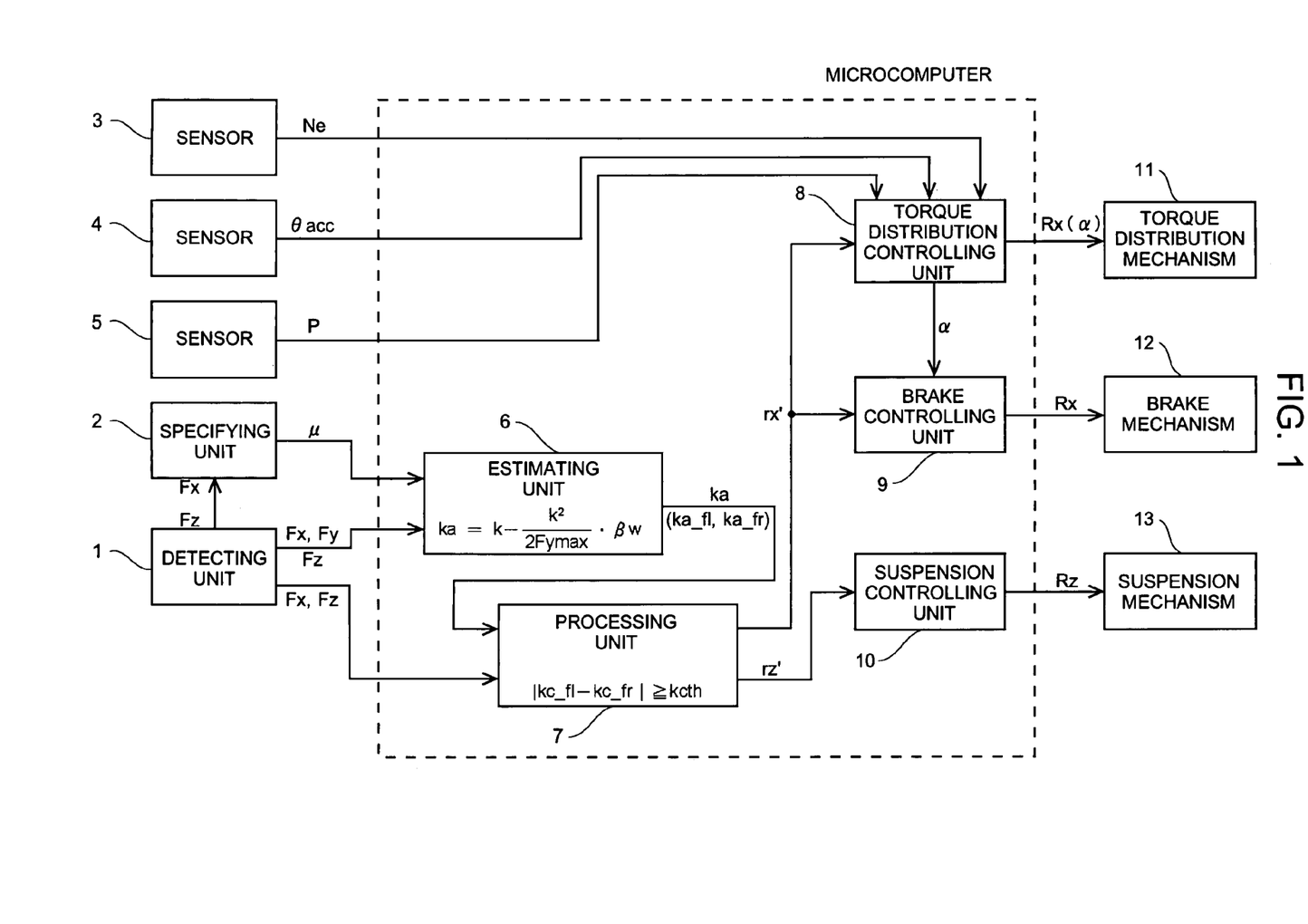
FIG. 1 is a block diagram showing the overall construction of a vehicle control device according to the present embodiment.

FIG. 1 is a block diagram showing the overall construction of a vehicle control device according to the present embodiment. The vehicle control device determines a longitudinal force distribution ratio to right and left wheels or a vertical force distribution ratio to the right and left wheels in consideration of cornering power ka of the right and left wheels. A driving force distribution ratio (or braking force distribution ratio) to the right and left wheels is controlled so that the longitudinal force acting on the wheels satisfies the longitudinal force distribution ratio thus determined. This varies a state of the vehicle (that is, the state quantity of the vehicle), and acts on the vehicle so that the cornering power ka of the right and left wheels approach a desired value, whereby steering stability of the vehicle can be enhanced. In order to clarify the concept of the vehicle control according to the present embodiment, the cornering power ka will be initially described, followed by description of the specific system construction and system process of the vehicle control device.

The cornering power ka is a variation rate of lateral force Fy (corresponding to component force that occurs in the direction perpendicular to the center face of a wheel, the component force being an element of the frictional force occurring on the ground plane when the wheel turns at some slide angle βw) due to minute variation of the wheel slide angle βw. That is, the cornering power ka can be defined as an inclination (differential value) of the lateral force Fy at some wheel slide angle βw. Therefore, the cornering power ka can be uniquely derived on the basis of the relationship between the wheel slide angle βw and the lateral force Fy. The cornering power ka is a parameter having a large effect on the steering stability of the vehicle. The lager the value of this parameter is, the faster the response to the behavior variation of the vehicle to the steering is, and the smaller the value of this parameter is, the slower the response to the behavior variation of the vehicle to the steering is. For example, the response to the behavior variation is desired to be fast under a cornering state or a traveling state on the surface of a low friction coefficient road, and it is basically preferable that the cornering power ka is large.

Figure 2:
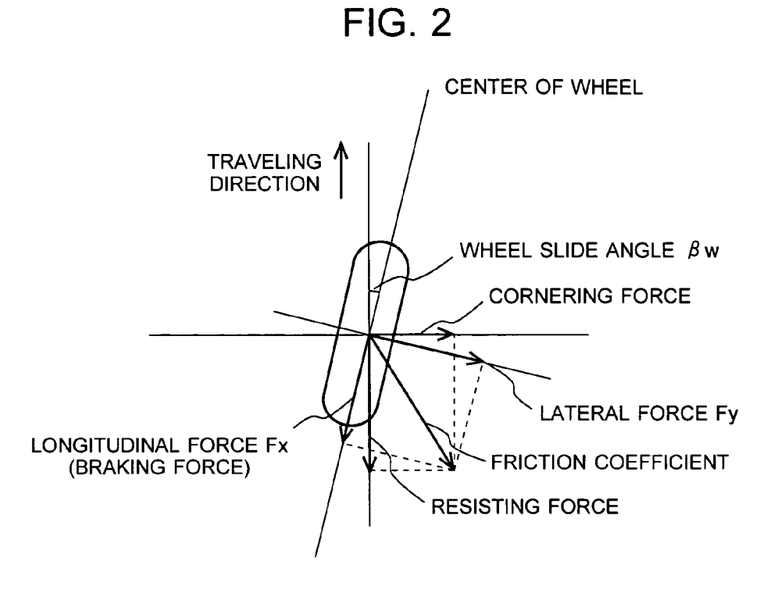
FIG. 2 is a diagram showing action force acting on the wheels.

FIG. 2 is a diagram showing action force acting on a wheel. As shown in FIG. 2, the action force concerning the wheel contains not only the lateral force Fy described above, but also longitudinal force Fx, cornering force, etc. When the wheel turns at some slide angle βw, the component force that occurs in the direction parallel to the center face of the wheel, the component force being an element of the frictional force occurring on the ground plane corresponds to the longitudinal force Fx, and the component force occurring in the direction perpendicular to the vehicle traveling direction corresponds to the cornering force. As not shown in the drawing, the action force concerning the wheel also contains a load in the vertical direction, so-called vertical force Fz (not shown).

The lateral force Fy and the cornering force in these force components cited as constituting the action force can be handled as relatively similar force components. The values of the lateral force Fy and cornering force are not in one-to-one correspondence. However, both the values are practically approximate to each other in the range of the wheel slide angle βw which can be taken by the vehicle. In this specification, the cornering force and the lateral force Fy are regarded as being substantially equal to each other, and the cornering power ka will be considered on the basis of the lateral force Fy. That is, if the relationship between the lateral force Fy and the cornering power ka is known in advance, the cornering power ka can be uniquely specified on the basis of the lateral force Fy. The relationship between the lateral force Fy and the cornering power ka will be considered below.

The wheel slide angle βw and the lateral force Fy acting on the wheel satisfy the following equation 1.

$$Fy = k \cdot \beta w - \frac{k^2}{4 F y \max} \cdot \beta w^2 \quad \text{[Equation 1]}$$

This equation 1 represents the lateral force Fy acting on the wheel with secondary approximation using the wheel slide angle βw based on a tire model indicating the mechanical characteristics of the wheel. In the equation, a coefficient k is a constant which can be experimentally determined, and varies dependently on a friction coefficient μ between the wheel and the road surface and the vertical force Fz (an equation 2).

$$k = \left. \frac{dFy}{d\beta w} \right|_{\beta w=0} \quad \text{[Equation 2]}$$

This coefficient k is a value representing the characteristic of the wheel. When this value is large, it means that the rigidity of the wheel is high. When this value is small, it means that the rigidity is low. As is apparent from this equation, the coefficient k corresponds to the inclination (differential value) of the lateral force Fy when the wheel slide angle βw is equal to zero. This value will be hereunder described as standard cornering power k.

The lateral force maximum value Fymax corresponding to the maximum value which can be achieved for the lateral force Fy is calculated from the vertical force Fz, the longitudinal force Fx and the friction coefficient μ according to the equation 3.

$$Fy\max = \sqrt{\mu^2 \cdot Fz^2 - Fx^2} \quad \text{[Equation 3]}$$

The cornering power ka corresponds to the inclination (differential value) of the lateral force Fy at some wheel slide angle βw, and thus can be represented by the equation 4 achieved by differentiating the equation 1 with the wheel slide angle βw.

$$ka = k - \frac{k^2}{2 F y \max} \cdot \beta w \quad \text{[Equation 4]}$$

As is apparent from the equations 1 to 4, if the longitudinal force Fx, the lateral force Fy and the vertical force Fz acting on the wheel and the friction coefficient μ are known, the wheel slide angle βw is uniquely specified. When the wheel slide angle βw is specified, the cornering power ka of the wheel can be uniquely calculated on the basis of the relationship between the wheel slide angle βw and the lateral force Fy.

Next, the relationship between the longitudinal force Fx (or the vertical force Fz) and the cornering power ka will be described. The relationship between the longitudinal force Fx and the cornering power ka can be represented as the equation 5 by eliminating the wheel slide angle βw from the equation 1 and the equation 4.

$$ka = k\sqrt{1 - \frac{Fy}{Fy\max}} \qquad \text{[Equation 5]}$$

Here, by replacing Fymax in the same equation by the equation 3, the equation 5 is converted to the equation 6.

$$ka = k\sqrt{1 - \frac{Fy}{\sqrt{\mu^2 \cdot Fz^2 - Fx^2}}} \qquad \text{[Equation 6]}$$

In order to see the tendency of the cornering power ka, the fractional part of the equation 6 is divided by the product ($\mu \cdot Fz$) of the friction coefficient $\mu$ and the vertical force Fz to be made dimensionless (equation 7).

$$ka = k\sqrt{1 - \frac{\frac{Fy}{\mu \cdot Fz}}{\sqrt{1 - \left(\sqrt{\frac{Fx}{\mu \cdot Fz}}\right)^2}}} \qquad \text{[Equation 7]}$$

Figure 3:
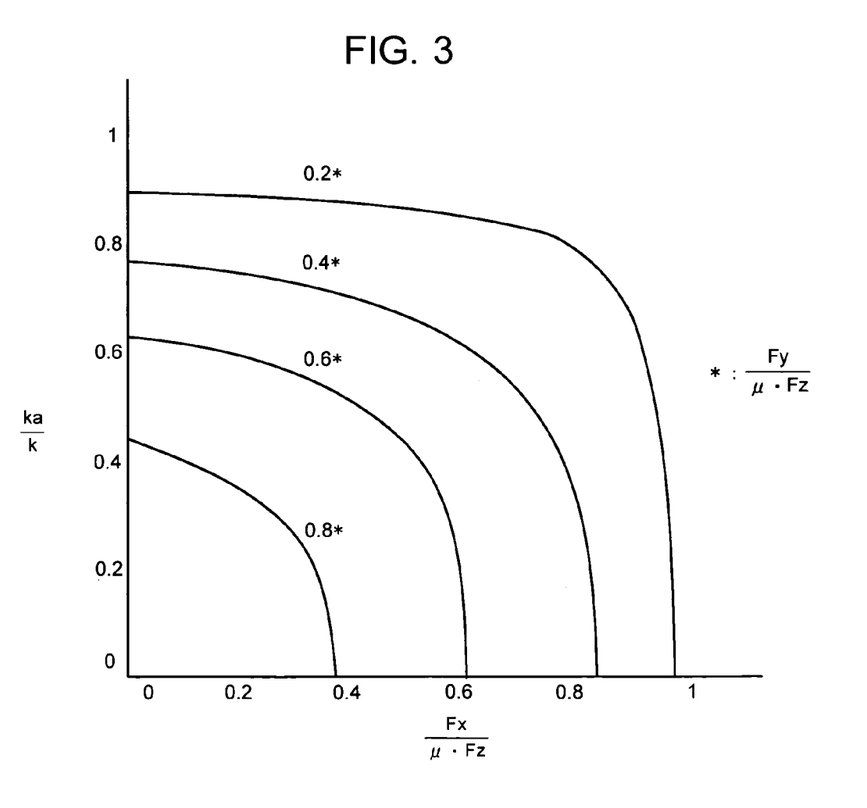
FIG. 3 is a diagram showing the relationship between the longitudinal force and the cornering power.

FIG. 3 is a diagram showing the relationship between the longitudinal force Fx and the cornering power ka. FIG. 3 is a graphed diagram of the equation 7, where the vertical axis represents the cornering power ka while the horizontal axis represents the dimensionless longitudinal force (Fx/μFz). For the same of convenience, the cornering power ka is divided by the standard cornering power k to make the verticals axis dimensionless. This means that the longitudinal force Fx increases as the position on the horizontal axis is directed from 0 to 1, and the cornering power ka increases as the position on the vertical axis is directed from 0 to 1. Furthermore, in FIG. 3, the relationship between the longitudinal force Fx and the cornering power ka is indicated by solid lines when the numerator of the equation 7 (Fy/μFz) is set to 0.2, 0.4, 0.6 and 0.8. The solid lines basically show the same tendency irrespective of the value of the numerator (Fy/μFz). However, as this value (Fy/μFz) increases, the relationship between the longitudinal force Fx and the cornering power ka decreases relatively as this value. As is apparent from FIG. 3, the value of the cornering power ka increases as the longitudinal force Fx decreases, and decreases as the longitudinal force Fx increases. Accordingly, in order to increase the cornering power ka of the wheel, the longitudinal force Fx acting on the wheel may be decreased. The adjustment of the longitudinal force Fx can be carried out by controlling the driving force or braking force applied to the wheel.

There is assumed a state that the driving force (or braking force) is stationarily applied to wheels in a general vehicle having four wheels. The sum of the longitudinal force Fx acting on the respective wheels is constant, and thus decreasing the longitudinal force Fx acting on some wheel results in increasing the longitudinal force Fx acting on the other wheels. Therefore, it is difficult to decrease all the longitudinal force Fx acting on the respective wheels as well as increase all the cornering power components ka of the respective wheels. Consequently, according to the present embodiment, the control is carried out (the cornering power ka to the right and left wheels is maximized) by varying a longitudinal force distribution ratio rx to the right and left wheels so that the representative value (for example, the average value) of the respective cornering power ka of the right and left wheels is larger than the current value (preferably, the maximum value).

Figure 4:
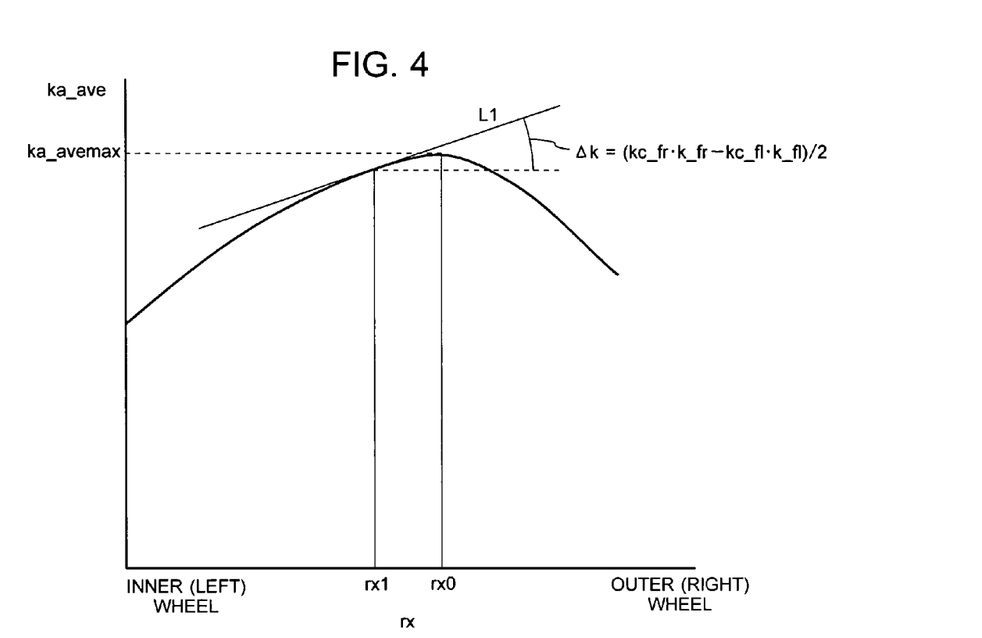
FIG. 4 is a diagram showing the relationship between the average value of normalized cornering powers of right and left wheels and the longitudinal force distribution ratio to the right and left wheels.

FIG. 4 is a diagram showing the relationship between the normalized average value ka_ave of the cornering power of the right and left wheels and the longitudinal force distribution ratio rx of the right and left wheels. The relationship between the inner wheel (left front wheel) and the outer wheel (right front wheel) when the vehicle is turning left is shown as an example in FIG. 4. In the following description, the cornering power ka of the left front wheel is represented by ka_fl, and the cornering power ka of the right front wheel is represented by ka_fr, thereby discriminating the cornering power ka of the respective wheels from one another. The relationship shown in FIG. 4 can be uniquely determined by deriving the relationship between the average value ka_ave ((ka_fl+ka_fr)/2) of the cornering power of the right and left wheels and the longitudinal force distribution ratio rx from the cornering power ka_fl and the cornering power ka_fr calculated based on the equation 7. If the average value ka_ave of the cornering power of the right and left wheels is set on the vertical axis and the longitudinal force distribution ratio rx is set on the horizontal axis, the relationship therebetween becomes an upwardly convex-shaped graph having a maximum value (ka_avemax) at some longitudinal force distribution ratio rx (rx0). When the vehicle is turning left, the longitudinal force distribution rx0 which can provide the maximum value is shifted to the outer (right) wheel as compared with the position that the longitudinal force distribution ratio rx is one to one against the right and left wheels.

A variation rate Δk of the average value ka_ave of the cornering power based on the longitudinal force distribution ratio rx to the right and left wheels will be considered with reference to FIG. 4. The variation rate Δk is an inclination (differential value) concerning the tangent line (line L1) of the average value ka_ave of the cornering power at some longitudinal force distribution ratio rx. Specifically, the line L1 becomes the most rightwardly rising line (Δk: positive value) when the longitudinal force distribution ratio rx is most shifted to the inner wheel (left wheel), and the inclination thereof becomes more horizontal as the longitudinal force distribution ratio rx is shifted to the outer wheel (right wheel) The line L1 becomes a horizontal line (Δk:0) at the longitudinal force distribution ratio rx0, and becomes a more rightwardly decreasing line as the longitudinal force distribution ratio rx is further shifted to the outer wheel (right wheel). When the longitudinal force distribution ratio rx is most shifted to the outer wheel (right wheel), the line L1 becomes the most rightwardly decreasing line (Δk: negative value).

Here, it is assumed that the present longitudinal force distribution ratio rx is set to one-to-one state to the right and left wheels (longitudinal force distribution ratio rx1) As shown in FIG. 4, when the vehicle is turning left, the longitudinal force distribution ratio rx1 is located to be more shifted to the inner (left) wheels than the longitudinal force distribution ratio rx0, so that the line L1 exhibits a rightwardly increasing tendency, and the variation rate Δk is equal to a positive predetermined value. In order to increase the average value ka_ave of the cornering power of the right and left wheels at this longitudinal force distribution ratio rx, the longitudinal force distribution ratio rx is required to vary so that the inclination of the line L1 is gentler (Δk is decreased). In the case of FIG. 4, if the longitudinal force distribution ratio rx is more shifted to the outer wheels than the present longitudinal force distribution ratio rx1, the inclination of the line L1 is more gentler (Δk is decreased), and the average value ka_ave of the cornering power increases to the maximum value ka_avemax. Accordingly, even under any traveling state, by varying the longitudinal force distribution ratio rx in the direction that the variation rate Δk is close to zero, the average value ka_ave of the cornering power could increase to the maximum value ka_avemax (preferably, it coincides with the maximum value ka_avemax).

The variation rate Δk described above can be represented as the following equation 8.

$$\Delta k = \frac{kc\_fr \cdot k\_fr - kc\_fl \cdot k\_fl}{2} \quad [\text{Equation 8}]$$

In the equation 8, k_fl represents the standard cornering power k of the left front wheel, while k_fr represents the standard cornering power k of the right front wheel. Furthermore, kc_fl represents the variation rate of the dimensionless cornering power ka_fl/k_fl based on the dimensionless longitudinal force Fx/μFz concerning the left front wheel (hereinafter merely referred to as "a left front wheel variation rate kc_fl"). Furthermore, kc_fr represents the variation rate of the dimensionless cornering power ka_fr/k_fr based on the dimensionless longitudinal force Fx/μFz concerning the right front wheel (hereinafter merely referred to as "a right front wheel variation rate kc_fr"). As is apparent from the equation 8, the variation rate Δk is proportional to the difference between the product (kc_fr·k_fr) of the right front wheel variation rate kc_fr and the standard cornering power k_fr of the right front wheel and the product (kc_fl·k_fl) of the left front wheel variation rate kc_fl and the standard cornering power k_fl of the left front wheel. Accordingly, these product values kc_fr·k_fr, kc_fl·k_fl would approach to each other, in order to bring the variation rate Δk closer to zero.

Figure 5:
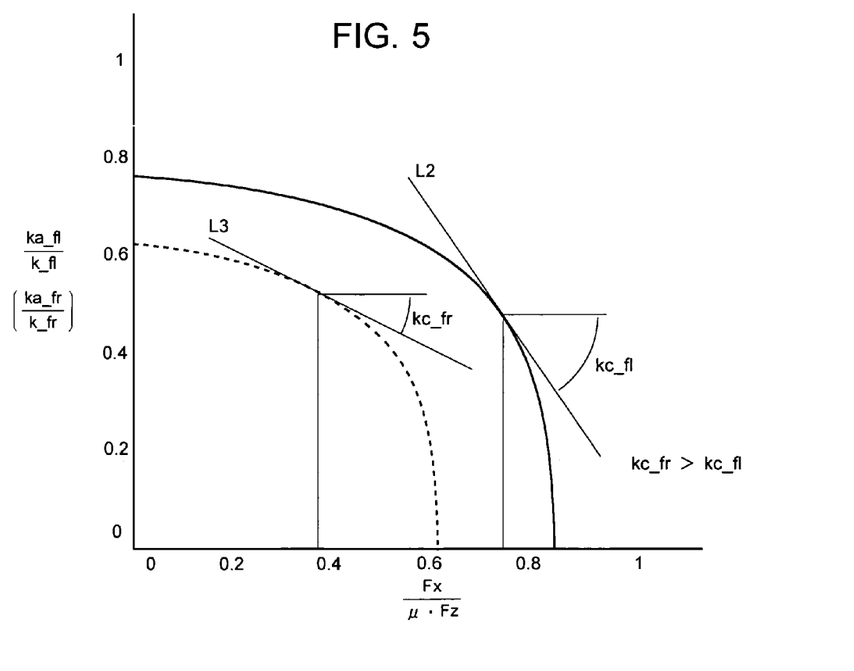
FIG. 5 is a diagram showing the relationship between the longitudinal force and the cornering power.

FIG. 5 is a diagram showing the relationship between the cornering power ka and the longitudinal force Fx, in which the horizontal axis (longitudinal force Fx) and the vertical axis (cornering power ka) are made dimensionless similarly to FIG. 3. It is assumed that the vehicle is turning left under the condition that the longitudinal force distribution ratio rx is set to the one-to-one distribution to the right and left wheels like FIG. 4. In FIG. 5, the relationship between the cornering power ka_fl of the inner wheel (left front wheel) and the longitudinal force Fx is indicated by a solid line. On the other hand, the relationship between the cornering power ka_fr of the outer wheel (right front wheel) ka_fr and the longitudinal force Fx is indicated by a dotted line. In FIG. 5, the left front wheel variation rate kc_fl described above corresponds to the inclination (differential value) concerning the tangent line (line L2) of the left front wheel cornering power ka_fl under some longitudinal force Fx. Furthermore, the right front wheel variation rate kc_fr corresponds to the inclination (differential value) concerning the tangent line (line L3) of the cornering power ka_fr of the right front wheel under some longitudinal force Fx. In FIG. 5, the vertical axis is made dimensionless. When the normalized cornering power ka_fl (or ka_fr) is set to the vertical axis, the inclinations of the respective lines L2, L3 are represented by kc_fl·k_fl (line L2) and kc_fr·k_fr (line L3). Accordingly, bringing the variation rate Δk indicated in the equation 8 closer to zero is equivalent to bringing the inclination (the left front wheel variation rate kc_fl) of the line L2 and the inclination (right front wheel variation rate kc_fr) of the line L3 closer to each other.

Therefore, the tendency of each variation rate kc_fl, kc_fr in connection with the variation of the longitudinal force Fx will be considered. It is estimated to the relationship between the cornering powers ka_fl, ka_fr of the right and left wheels and the longitudinal force Fx that the respective variation rates kc_fl, kc_fr in connection with the variation of the longitudinal force Fx have the same tendency because they have different values, but basically exhibit the same graph tendency. Therefore, in the following description, only the tendency of the left front wheel variation rate kc_fl in connection with variation of the longitudinal force Fx will be described. When the longitudinal force Fx acting on the left front wheel is the maximum, the line L2 is a rightwardly decreasing line having a sharp inclination, and the left front wheel variation rate kc_fl has the minimum value (negative value) Decreasing the longitudinal force Fx acting on the left front wheel from the above state changes the line L2 to a line having a gentler inclination, as well as increases the value of the left front wheel rate variation kc_fl. When the longitudinal force Fx acting on the left front wheel is equal to zero, the inclination of the line L2 is the gentlest, and the left front variation rate kc_fl becomes the maximum value (negative value) For example, as shown in FIG. 5, there will be considered such case that the left front wheel variation rate kc_fl is smaller than the right front wheel variation rate kc_fr (kc_fr>kc_fl), that is, the line L2 has a steeper inclination than the line L3. In order to bring the inclinations of the lines L2, L3 closer to each other, the longitudinal force FX of the left front wheel is decreased to make the inclination of the line L2 gentler than the present inclination thereof, and the longitudinal force Fx of the right front wheel is increased to make the inclination of the line L3 steeper than the present inclination. In other words, the left front wheel variation rate kc_fl and the right front wheel variation rate kc_fr are compared with each other, and the longitudinal force Fx acting on one wheel having a smaller variation rate (the left front wheel in the case of FIG. 5) is decreased while the longitudinal force Fx acting on the other wheel having a larger variation rate (the right front wheel in the case of FIG. 5) is increased. Accordingly, the inclination of the line L2 (the left front wheel variation rate kc_fl) and the inclination of the line L3 (the right front wheel variation rate kc_fr) are made to approach to each other, and Δk is made to approach zero. Therefore, according to the present embodiment, based on the knowledge described above, a target longitudinal force distribution ratio rx' at which Δk approaches zero is determined by changing the distribution ratio from the present longitudinal force distribution ratio rx by a predetermined amount. A driving force (braking force) distribution ratio Rx is controlled so that the longitudinal force acting on the wheels is equal to the target longitudinal force distribution ratio rx'. For example, in the case of FIG. 5, the target longitudinal distribution ratio rx' is determined so as to be more shifted to the right wheels than the longitudinal distribution ratio rx.

Referring to FIG. 3 again, the relationship between the vertical force Fz and the cornering power ka can be understood from the dimensionless graph. In FIG. 3, the shift of the position on the horizontal axis from 0 to 1 means that the vertical force Fz decreases. The value of the cornering power ka decreases as the vertical force Fz decreases, and increases as the vertical force Fz increases. That is, increasing the vertical force Fz acting on the wheel increases the cornering power ka of the wheel. The adjustment of the vertical force Fz may be carried out by controlling the vertical load acting on the wheel. However, similarly to the longitudinal force FX described above, the sum of the vertical force Fz acting on the respective wheels is constant. Thus, the cornering power ka is maximized by adjusting a vertical force distribution ratio rz to the right and left wheels.

The relationship shown in FIG. 3 is made dimensionless, so that the relationship between the average value ka_ave of the normalized cornering power of the right and left wheels and the vertical force distribution ratio rz to the right and left wheels have the same tendency as shown in FIG. 4. When the average value ka_ave of the cornering power of the right and left wheels are set to the vertical axis and the vertical force distribution ratio rz is set to the horizontal axis, the relationship therebetween corresponds to a convex-up graph having the maximum value (ka_avemax) at some vertical force distribution ratio rz (rz0 (corresponding to rx0)). Accordingly, by changing the vertical force distribution ratio rz so as to bring the variation rate Δk closer to zero, the average value ka_ave of the cornering power increases to the maximum value ka_avemax. In order to bring the variation rate Δk closer to zero, the products kc_fr·k_fr, kc_fl·k_fl shown in the equation 8 merely approach to each other.

The relationship between the vertical force Fz and the cornering power ka can be understood because FIG. 5 is made dimensionless. For example, as shown in FIG. 5, there will be considered such a case that the present left front wheel variation rate kc_fl is smaller than the right front wheel variation rate kc_fr (kc_fr>kc_fl), that is, the line L2 has a sharper inclination than the line L3. In order to bring the inclinations of the lines L2, L3 closer to each other, the vertical force Fz of the left front wheel is increased to make the inclination of the line L2 gentler than the present inclination thereof, and the vertical force Fz of the right front wheel is decreased to make the inclination of the line L3 steeper than the present inclination. In other words, the left front wheel variation rate kc_fl and the right front wheel variation rate kc_fr are compared with each other, and the vertical force Fz acting on one wheels having a smaller variation rate (the left wheels in the case of FIG. 5) is increased while the vertical force Fz acting on the other wheels having a larger variation rate (the right wheels in the case of FIG. 5) is decreased. Accordingly, the inclination of the line L2 (the left front wheel variation rate kc_fl) and the inclination of the line L3 (the right front wheel variation rate kc_fr) are made to approach to each other, and Δk is made to approach zero. Therefore, according to the present embodiment, a target vertical force distribution ratio rz' at which Δk approach zero is determined by changing the distribution ratio from the present vertical force distribution ratio rz by a predetermined amount. The vertical load distribution ratio Rz is controlled so that the vertical force acting on the wheels satisfies the target vertical distribution ratio rz'. For example, in the case of FIG. 5, the target vertical force distribution ratio rz' is determined so as to be more shifted to the left wheels than the present vertical force distribution ratio rz.

Returning to FIG. 1, the system construction of the vehicle control device according to the present embodiment will be described in consideration of the concept of the vehicle control as described above. As the vehicle control device may be used as a microcomputer comprising CPU, RAM, ROM, an input/output interface, etc. The vehicle control device carries out the operation on the above control values (for example, the longitudinal force distribution ratio rx, the vertical force distribution ratio rz) according to a control program stored in the ROM. The driving force (braking force) distribution ratio or vertical load distribution ratio which corresponds to the control values derived through this operation is calculated. Subsequently, the control signals corresponding to the calculation result are output to various actuators. In order to carry out this calculation, action force acting on the wheel which is achieved from a detecting unit 1 and the friction coefficient μ between the wheel and the road surface which is achieved from a specifying unit 2 are input to the vehicle control device. Furthermore, vehicle state signals achieved from sensors 3, 4 (an engine rotational number Ne, an accelerator opening degree θacc) and a gear position signal P indicating the present gear position of the transmission achieved from a sensor 5 are further input to the vehicle control device.

The detecting unit 1 comprises at least one stress detection sensor (for example, resistive strain gage) secured to a wheel shaft connected to the wheels, and a signal processing circuit for processing a detection signal from the stress detection sensor. The detecting unit 1 is equipped for each wheel, and the action force concerning each wheel is input to the vehicle control device. The detecting unit 1 detects the action force through stress based on the knowledge that the stress occurring in the wheel shaft due to the action force is proportional to the action force. Three force components of the lateral force Fy, the longitudinal force Fx and the vertical force Fz exist as the action force detected by the detecting unit 1. In FIG. 1, the detecting unit 1 is illustrated as one block for convenience. However, this block collectively represents the overall elements of the detecting unit 1 equipped for the respective wheels. The detailed construction of the detecting unit 1 is described in JP-A-4-331336, and may be referred to if necessary.

The specifying unit 2 specifies the friction coefficient μ between the wheel and the road surface. In the present embodiment, the specifying unit 2 specifies the friction coefficient μ as the ratio between the road surface frictional force (that is, the longitudinal force Fx) and the vertical force Fz by using the output information from the detecting unit 1 described above. However, for specifying the friction coefficient μ, the specifying unit 2 may estimate the friction coefficient μ by using a well-known method instead of specifying the friction coefficient based on the output value from the detecting unit 1. As the method of estimating the friction coefficient μ may be used a method of comparing a present vehicle yaw rate, steering angle, lateral acceleration and vehicle speed with these values at various friction coefficients μ for estimation. One of such estimating methods is disclosed in JP-A-8-2274 proposed by the applicant of the present application, and may be referred to if necessary. If the detecting unit 1 calculates the friction coefficient μ based on the detection result thereof, the specifying unit 2 shown in FIG. 1 may be omitted while the detecting unit 1 may function as the specifying unit 2.

If the microcomputer is functionally considered, the vehicle control device comprises an estimating unit 6, a processing unit 7, and controlling units 8 to 10. The estimating unit 6 reads in the action force Fx, Fy, Fz detected for each wheel and the specified friction coefficient μ, and calculates the cornering power Ka of each wheel based on the values thus read in. The processing unit 7 determines the longitudinal force distribution ratio rx (or the vertical force distribution ratio rz) so that the average value ka_ave of the cornering power of the right and left wheels is larger than the present value of the average value ka_ave of the cornering power of the right and left wheels. Specifically, the processing unit 7 calculates the variation rate kc_fl, kc_fr of the cornering power ka based on the longitudinal force Fx (or the vertical force Fz) for each of the right and left wheels. Based on the variation rate kc_fl, kc_fr concerning the right and left wheels thus calculated, the longitudinal force distribution ratio rx (or the vertical force distribution ratio rz) is determined so that the variation rate kc_fl concerning the left wheel and the variation rate kc_fr concerning the right wheel approach to each other. The longitudinal force distribution ratio rx (or the vertical force distribution ratio rz) thus determined is output to any one of the controlling units 8 to 10 as the control signal.

The controlling units 8 to 10 comprise a torque distribution controlling unit 8, a brake controlling unit 9 and a suspension controlling unit 10, which are selectively used in accordance with the state of the vehicle to be controlled. For example, when a prescribed longitudinal distribution ratio rx is determined through the operation by the processing unit 7, the processing unit 7 outputs the control signal corresponding to the value thus determined to the torque distribution controlling unit 8 or the brake controlling unit 9. Accordingly, the torque distribution controlling unit 8 controls a torque distribution mechanism 11, or the brake controlling unit 9 controls a brake mechanism 12, thereby controlling the driving force distribution ratio (or the braking force distribution ratio) Rx to the right and left wheels. In addition, when a prescribed vertical force distribution ratio rz is determined through the operation by the processing unit 7, the processing unit 7 outputs the control signal corresponding to a value thus determined to the suspension controlling unit 10. Accordingly, the suspension controlling unit 10 controls a suspension control mechanism 13, thereby controlling the vertical load distribution ratio Rz to the right and left wheels.

Figure 6:
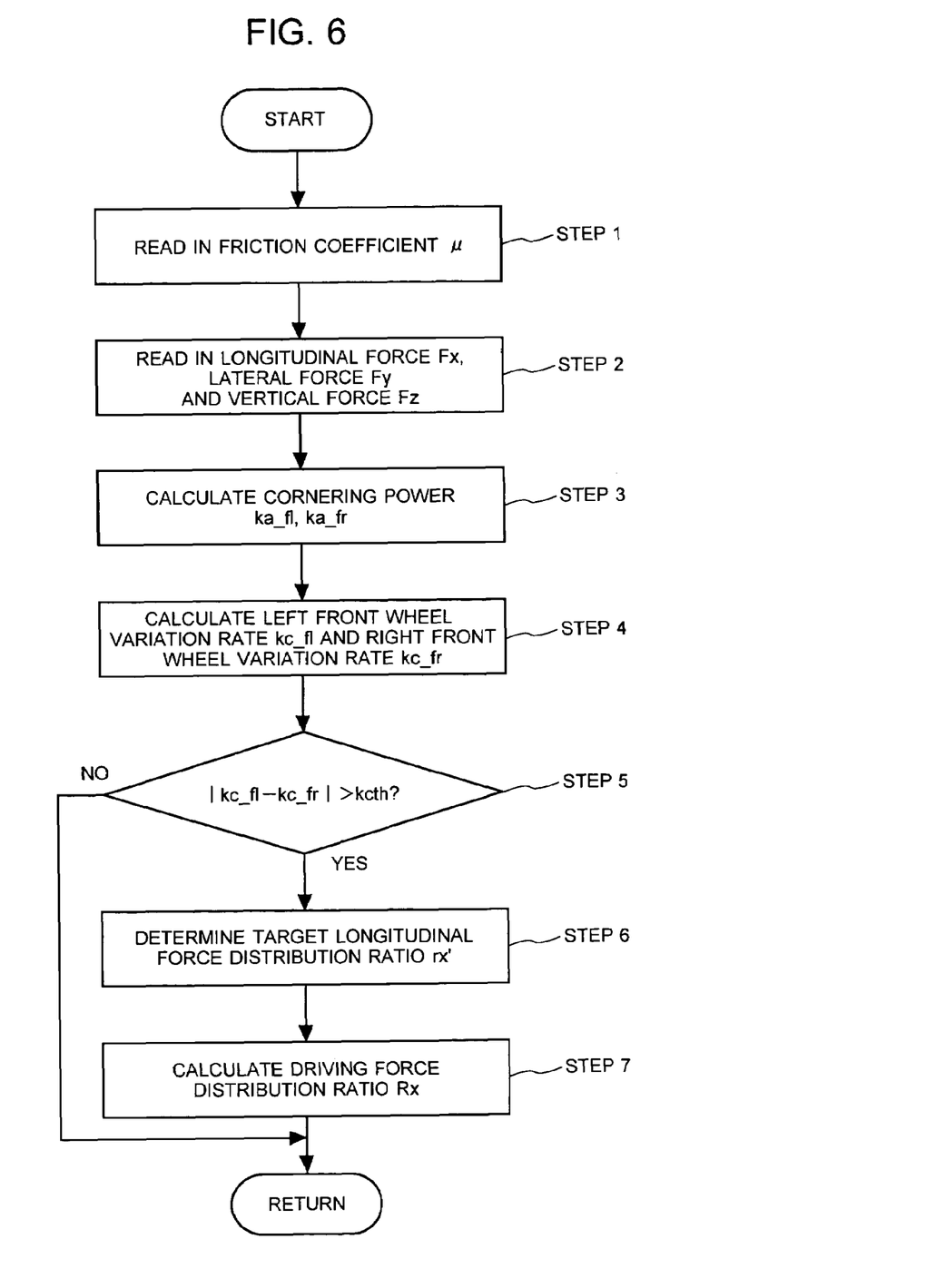
FIG. 6 is a flowchart showing the process of the vehicle control according to the present embodiment.

FIG. 6 is a flowchart showing a process of the vehicle control according to the present embodiment. The process shown in this flowchart is loaded every predetermined interval, and executed by the microcomputer. The system process according to the present embodiment will be described with reference to FIG. 6. A method of maximizing the cornering power ka concerning the front wheel by controlling the longitudinal force distribution ratio rx of the right and left wheels at the front wheel will be described hereunder. First, in step 1, the estimating unit 6 reads in the friction coefficient μ. The estimating unit 6 reads in the longitudinal force Fx, the lateral force Fy and the vertical force Fz based on the sensor signals from the detecting unit 1 (step 2). Subsequently, the cornering power ka of each wheel is calculated based on the equation 4 by using the information thus read in (step 3).

In step 4, the variation rate (left front wheel variation rate) kc_fl of the cornering power ka_fl based on the longitudinal force Fx concerning the left front wheel is calculated on the basis of the cornering power ka of each wheel thus calculated. Specifically, the left front wheel variation rate kc_fl is calculated as the inclination (differential value) concerning the tangent line (for example, the line L2 shown in FIG. 5) corresponding to the value ka_fl based on the cornering power ka_fl of the left front wheel thus calculated. Furthermore, the variation rate (right front wheel variation rate) kc_fr of the cornering power ka_fr based on the longitudinal force fx concerning the right front wheel is calculated in the same manner.

In step 5, it is judged whether the absolute value of the difference between the left front wheel variation rate kc_fl and the right left wheel variation rate kc_fr is larger than a predetermined judgment value kcth. The judgment process as described above is provided because when the respective variation rates kc_fl, kc_fr are approximate to each other at the present stage, the average value ka_ave of the cornering power of the right and left wheels has been already close to the maximum value with high probability, and thus it is unnecessary to daringly change the vehicle state. Therefore, it is judged whether it is necessary to maximize the cornering power ka prior to the process of the steps 6, 7 in order to avoid the control under such a condition.

The judgment value kcth is preset through experiments or simulations as the maximum value concerning the absolute value of the difference between the respective variation rates kc_fl, kc_fr at which the left front wheel variation rate kc_fl and the right front wheel variation rate kc_fr are regarded as being substantially identical to each other. Accordingly, if a positive judgment is made (that is, the absolute value of the difference between the left front wheel variation rate kc_fl and the right front variation rate kc_fr is larger than the judgment value kcth), the process goes to step 6 subsequent to the step 5. On the other hand, if a negative judgment is made (that is, the absolute value of the difference between the left front wheel variation rate kc_fl and the right front variation rate kc_fr is less than or equal to the judgment value kcth), the steps 6, 7 are skipped and the process drops out of the routine.

In the step 6 subsequent to the step 5, the target vertical force distribution ratio rz' is determined based on the present longitudinal force distribution ratio rx of the right and left wheels. Specifically, the variation rates kc_fl, kc_fr of the right and left wheels thus calculated are compared with each other. The target longitudinal force distribution ratio rx' is determined as such a value that the longitudinal force Fx acting on the one wheel having a small variation rate is smaller than the present longitudinal force distribution ratio rx and the longitudinal force Fx acting on the other wheel having a large variation rate is larger than the present longitudinal force distribution ratio rx. For example, as shown in FIG. 5, under the condition that the right front wheel variation rate kc_fr is larger than the left front wheel variation rate kc_fl, the target longitudinal force distribution ratio rx' is calculated so that the longitudinal force distribution ratio rx is more shifted to the right front wheel than the present longitudinal force distribution ratio rx by only the step value. On the other hand, under the condition that the right front wheel variation rate kc_fr is smaller than the left front wheel variation rate kc_fl, the target longitudinal force distribution ratio rx' is calculated so that the longitudinal force distribution ratio rx is more shifted to the left front wheel than the present longitudinal force distribution force rx by only the step value.

In step 7, the driving force distribution ratio Rx to the right and left wheels is calculated based on the target longitudinal force distribution ratio rx' thus determined. Specifically, an engine output is first estimated based on the engine rotational number Ne and the throttle opening degree θacc. Subsequently, the engine output is multiplied by the gear ratio corresponding to the gear position P to calculate an input torque Ti. On the basis of the target longitudinal force distribution ratio rx' and the input torque Ti, a torque distribution ratio α (that is, the driving force distribution ratio Rx) to the right and left front wheels is calculated in consideration of the torque distribution ratio to the front and rear wheels so as to achieve the target longitudinal force distribution ratio rx'. The torque distribution controlling unit 8 outputs to a torque distribution mechanism 11 the control signal corresponding to the torque distribution ratio α to the right and left wheels thus determined, and then the process drops out of the routine.

The torque distribution mechanism (for example, a front differential device) 11 operates in response to the control signal thus output, and controls the torque distribution applied to the right and left front wheels. Thus, the driving force distribution ratio Rx is controlled so that the longitudinal force Fx acting on the right and left front wheels satisfies the target longitudinal force distribution ratio rx' adjusted by only the step value. The detailed driving force distribution control for the wheels is disclosed in JP-A-8-2274, and may be referred to if necessary.

As described above, according to the present embodiment, the variation rate (left front wheel variation rate) kc_fl of the cornering power based on the longitudinal force Fx concerning the left front wheel and the variation rate (right front wheel variation rate)kc_fr of the cornering power based on the longitudinal force Fx concerning the right front wheel are calculated. Subsequently, by comparing the respective variation rates kc_fl, kc_fr calculated with each other, the target longitudinal force distribution ratio rx' is determined so that the longitudinal force Fx acting on one wheel having a small variation rate is decreased while the longitudinal force Fx acting on the other wheel having a large variation is increased. Then, the driving force distribution ratio Rx is controlled so that the longitudinal force Fx acting on the wheels is equal to the target longitudinal force distribution ratio rx'. Accordingly, the vehicle state is varied, and the left front wheel variation rate kc_fl and the right front wheel variation rate kc_fr are made to approach to each other, so that the average value ka_ave of the cornering power of the right and left front wheels is larger than that before the vehicle state is controlled. As described above, it is difficult to individually increase the cornering power ka of each wheel, however, the cornering power ka can be increased on average over all the front wheels (or rear wheels). Accordingly, the response to the behavior variation can be made fast, and thus the steering stability of the vehicle under the traveling state such as cornering can be enhanced.

In the above-described embodiment, the maximization of the average value ka_ave of the cornering power for the right and left front wheels as a control target has been described. The maximization of the cornering power ka can be performed for the right and left rear wheels as a control target based on the same concept. Furthermore, the maximization of the cornering power ka can be performed for the respective right and left front and rear wheels as a control target.

Furthermore, the control corresponding to the step value (minute value) is carried out for the purpose of giving priority to the stability of the control. However, the target longitudinal force distribution ratio rx' may be directly calculated so that the left front wheel variation rate kc_fl is equal to the right front wheel variation rate kc_fr. The target longitudinal force distribution ratio rx' can be uniquely calculated by regarding the left front wheel variation rate kc_fl and the right front wheel variation rate kc_fr as being equivalent to each other and carrying out a predetermined numerical calculation. However,the calculation of this method is complicate, so that the process is cumbersome. Therefore, the target longitudinal force distribution ratio rx' may be calculated based on a convergence calculation or the like so that the left front wheel variation rate kc_fl and the right front wheel variation rate kc_fr are the same.

In the present specification, the average value is used as the representative value of the cornering power ka of the right and left wheels. However, the sum or product of the cornering power ka of the right and left wheels may be used in place of the average value. Even when the sum or product of the cornering power ka of the right and left wheels is used, the basic concept is the same. Thus, the steering capability can be enhanced by controlling the vehicle state so that the representative value of the cornering power ka of the right and left wheels is larger than the present value.

Furthermore, if the vehicle state is controlled so as to achieve the target longitudinal force distribution ratio rx', it may be carried out by controlling the braking force distribution ratio Rx. This control is carried out by the brake controlling unit 9. Information (that is, the torque distribution ratio α) is input from the torque distribution controlling unit 8 described above to the brake controlling unit 9. Therefore, the brake controlling unit 9 calculates the braking force distribution ratio Rx based on the torque distribution ratio α and the target longitudinal force distribution ratio rx' so that the longitudinal force Fx acting on the wheels satisfies the target longitudinal force distribution ratio rx'. Then, the brake controlling unit 9 outputs the control signal corresponding to the braking force distribution ratio Rx thus determined to the brake mechanism 12. Accordingly, the brake mechanism (for example, an ABS device) 12 operates in response to the control signal output from the brake controlling unit 9, and thus the braking force distribution applied to the wheels is controlled. Specifically, the braking force distribution ratio Rx is controlled so that the longitudinal force Fx acting on the wheels satisfies the target longitudinal force distribution ratio rx' adjusted by only the step value. Accordingly, the left front wheel variation rate kc_fl and the right front wheel variation rate kc_fr are made to approach to each other, whereby the average value ka_ave of the cornering powers of the right and left wheels can be made larger than the present average value.

In the foregoing description, the maximization of the cornering power of the right and left wheels is carried out by adjusting the longitudinal force distribution ratio rx to the right and left wheels. However, the maximization of the cornering power of the right and left wheels may be performed by adjusting the vertical force distribution ratio rz to the right and left wheels based on the concept described above. The content of the system process is basically the same as the process shown in FIG. 6, and the description thereof is omitted. Particularly, the different point resides in that the processing unit 7 determines the target vertical force distribution ratio rz' varied by only the step value. Specifically, the target vertical force distribution ratio rz' is determined so that the vertical force Fz acting on one wheel having a small variation in the respective variation rates kc_fl, kc_fr concerning the right and left wheels is increased while the vertical force Fz acting on the other wheels having a large variation rate is decreased. The control signal corresponding to the target vertical force distribution ratio rz' thus determined is output to the suspension controlling unit 10. The suspension controlling unit 10 determines the vertical load distribution ratio Rz to the right and left wheels so that the vertical force Fz acting on the wheels satisfies the target vertical distribution ratio rz', and outputs the control signal corresponding to the value thus determined to the suspension mechanism 13. Accordingly, the suspension mechanism 13 operates in response to the control signal output from the suspension controlling unit 10 to control the vertical load distribution z applied to the wheels. Specifically, the vertical load distribution ratio Rz is controlled so that the vertical force Fz acting on the wheels satisfies the target vertical force distribution ratio rz' adjusted by only the step value. Accordingly, the left front variation rate kc_fl and the right front wheel variation rate kc_fr are made to approach to each other, whereby the average value ka_ave of the cornering power of the right and left wheels can be made larger than the present average value. The detailed method of controlling the vertical load acting on the wheels is disclosed in JP-A-62-275814, and may be referred to if necessary.

Figure 7:
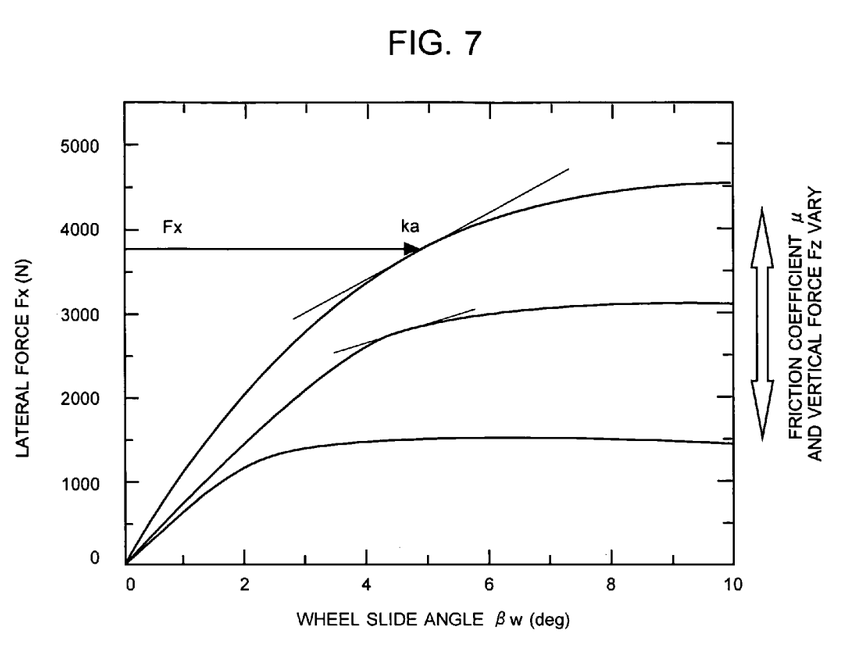
FIG. 7 is a diagram showing an example of the relationship between the wheel slide angle and the lateral force.

In the present embodiment, the relationship between the wheel slide angle βw and the lateral force Fy is defined by using a tire model and conducting secondary approximation to the tire model. However, the present invention is not limited to the present embodiment. For example, the relationship between the wheel slide angle βw and the lateral force Fy may be defined by using a tire model experimentally achieved under various conditions (the longitudinal force Fx, the vertical force Fz and the friction coefficient μ) or by using another numeric model (Fiala model or the like). FIG. 7 is a diagram showing an example of the relationship between the wheel slide angle βw and the lateral force Fy which is experimentally calculated. Even when such an experimental value is used, the cornering power ka of the wheel can be uniquely calculated as the rate (that is, differential value) of the lateral Fy increasing in connection with the increase of the wheel slide angle βw.

Furthermore, in the embodiment described above, the cornering power ka is defined as the equation 4. However, it may be briefly calculated as the equation 9.

$$kp = k - \frac{k^2}{4 \cdot Fy\max} \cdot \beta w \quad \text{[Equation 9]}$$

Here, in order to discriminate the cornering power ka described above, kp indicated in the equation 9 is referred to as a fictitious cornering power. The fictitious cornering power kp basically exhibits substantially the same tendency as the cornering power ka shown in the equation 4. Accordingly, the same action and effect can be achieved even when the fictitious cornering power kp is used in place of the cornering power ka used in the above-described embodiment.

The detecting unit 1 described above directly detects the action force acting on the wheels, and thus the cornering power ka having a strong non-linear element can be specified with high precision. As a result, for example, even under a traveling state such as critical cornering or even under a traveling state such as a low friction coefficient road surface, the cornering power ka can be specified with high precision. Accordingly, the maximization of the cornering power can be performed more effectively.

Second Embodiment

In the second embodiment, the maximization of the cornering power ka of the right and left wheels described above is carried out, and also the control values are further determined so that the stability factor of the vehicle is brought closer to a target stability factor. Here, the stability factor is an evaluation value indicating the steering characteristic of the vehicle, which is an index value for the behavior (that is, stability) of the vehicle during cornering. When this value is positive, the vehicle is in an under-steer tendency, and when this value is negative, the vehicle is in an over-steer tendency. The optimal value of the stability factor is different among vehicles, and is set at the designing stage or the like. If the vehicle travels while following the optimal value of the stability factor at all times, the motion state of the vehicle can be properly kept. The relationship between the maximization of the cornering power ka of the right and left wheels and the stability factor will be described hereunder.

Figure 8:
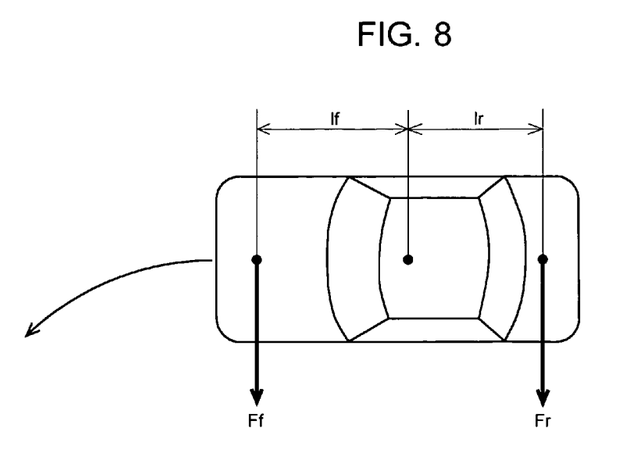
FIG. 8 is a diagram showing the moment acting on the vehicle.

FIG. 8 is a diagram showing moment acting on the vehicle. Considering a vehicle traveling with a constant steering angle, moment Ml (Ff×1f, 1f: distance from the center of gravity of the vehicle to the front wheels) around the vehicle which is caused by force Ff acting on the front wheels, and moment M2 (Fr×1r, 1r: distance from the center of gravity of the vehicle to the rear wheels) around the vehicle which is caused by force Fr acting on the rear wheels are normally balanced with each other. According to this relationship, a coefficient used for determining the steering characteristic from equations is the stability factor. However, if the longitudinal force distribution ratio rx to the right and left wheels at the front wheels (or rear wheels) is changed as in the first embodiment, the yaw moment corresponding to the longitudinal force distribution ratio control is induced in the vehicle. Accordingly, the balance between the moments M1 and M2 which are initially balanced with each other is lost, so that the stability factor may be out of the optimal value. Therefore, according to the second embodiment, the vehicle state is further controlled by adding the longitudinal force distribution ratio control to the right and left wheels so that the present vehicle stability factor approaches the target stability factor. Here, the fundamental form of the stability factor is represented in the equation 10.

$$A = -\frac{m}{2(1f + 1r)^2} \cdot \frac{1f \cdot ka\_fave - 1f \cdot ka\_rave}{ka\_fave \cdot ka\_fave} \quad \text{[Equation 10]}$$

Here, m represents the mass of the vehicle, 1f represents the distance between the wheel shaft of the front wheels and the center of gravity of the vehicle, and 1r represents the distance between the wheel shaft of the rear wheels and the center of gravity of the vehicle. Furthermore, ka_fave represents the average value of both the cornering powers ka_fl, ka_fr in which ka_fl represents the cornering power of the left front wheel and ka_fr represents the cornering power of the right front wheel. Likewise, ka_rave represents the average value of both the cornering powers ka_rl, ka_rr when ka_rl represents the cornering power of the left rear wheel and ka_rr represents the cornering power of the right rear wheel.

By setting the stability factor calculated from the sensors, etc. as an actual stability factor A1, the actual stability factor in consideration of the yaw moment based on the longitudinal force distribution ratio control of the right and left wheels can be represented by the following equation.

$$A1 = -\frac{m}{2(1f + 1r)^2} \cdot \frac{1f \cdot ka\_fave1 - 1f \cdot ka\_rave1}{ka\_fave1 \cdot ka\_rave1} \quad \text{[Equation 11]}$$

Here, ΔFx represents the difference in longitudinal force between the right and left wheels (positive value is set when the driving force of the outer wheels increases), d represents tread and y″ represents lateral acceleration. The values achieved by the detecting unit 1 or the specifying unit 2 are affixed with "1" after symbols.

By setting the optimal value of the stability factor A as a target stability factor A2, the following equation 12 may approach "0" in order to bring the actual stability factor A1 closer to the target stability factor A2.

$$\Delta A = A1 - A2 \qquad \text{[Equation 12]}$$

$$= -\frac{m}{2(1f+1r)^2} \cdot \left( \frac{\left(1f + \frac{\Delta Fx \cdot d}{m \cdot y''}\right) \cdot \text{ka\_fave1} - \left(1r - \frac{\Delta Fx \cdot d}{m \cdot y''}\right) \cdot \text{ka\_rave1}}{\text{ka\_fave1} \cdot \text{ka\_rave1}} - \frac{1f \cdot \text{ka\_fave2} - 1r \cdot \text{ka\_rave2}}{\text{ka\_fave2} \cdot \text{ka\_rave2}} \right)$$

Here, the respective values ka_fave, ka_rave concerning the target stability factor A2 are affixed with "2" after the symbols. These values ka_fave2, ka_rave2 are preset in accordance with the target stability factor A2. In order to bring ΔA shown in the equation 12 closer to zero, the average value ka_fave1 of the cornering power of the front wheels and the average value ka_rave1 of the cornering power of the rear wheels are controlled so that the equality of the equation 13 is satisfied.

$$\frac{1f + \frac{\Delta Fx \cdot d}{m \cdot y''}}{\text{ka\_rave1}} - \frac{1r - \frac{\Delta Fx \cdot d}{m \cdot y''}}{\text{ka\_fave1}} = \frac{1f}{\text{ka\_rave2}} - \frac{1r}{\text{ka\_fave2}} \qquad \text{[Equation 13]}$$

If it is assumed that the vehicle satisfies the target stability factor A2 before controlling the longitudinal force distribution ratio rx of the right and left wheels, it can be considered that a position of the center-of-gravity of the vehicle is virtually moved to the rear position by a predetermined value (ΔFx·d/m·y"), by only the longitudinal force distribution ratio control. In order to satisfy the equation 13, the average value ka_fave1 of the cornering power of the front wheels is increased, and the average value ka_rave1 of the cornering power of the rear wheels is decreased. In order to implement the cornering power as described above, the longitudinal force distribution ratio is determined so that the longitudinal force distribution ratio is more shifted to the rear wheels than the present longitudinal force distribution ratio to the front and rear wheels by only the step value. Then, the driving force distribution ratio (or the braking force distribution ratio) to the front and rear wheels may be controlled so that the longitudinal force acting on the front and rear wheels satisfies the longitudinal force distribution ratio thus determined. Alternatively, the vertical force distribution ratio to the front and rear wheels may be determined so that the vertical force distribution ratio is more shifted to the front wheels than the present vertical force distribution ratio by only the step value. In this case, the vertical load distribution ratio to the front and rear wheels may be controlled so that the vertical force acting on the front and rear wheels satisfies the longitudinal force distribution ratio thus determined.

As described above, the longitudinal force distribution ratio or vertical force distribution ratio to the front and rear wheels is controlled by only the step value, whereby the actual stability factor A1 is made to approach the target stability. Accordingly, the yaw moment caused by the longitudinal force distribution ratio control to the right and left wheels can be offset. Therefore, even when the vertical force distribution ratio control to the right and left wheels is carried out, the steering characteristic of the vehicle can be kept and the steering stability can be enhanced. The yaw moment described above basically occurs when the driving force distribution ratio control concerning the right and left wheels is carried out, and thus such a consideration is not required when the vertical force distribution ratio control concerning the right and left wheels is carried out.

For example, in the case of the wheels of four-wheel drive, a prescribed stability factor can be achieved while maximizing the cornering power ka by carrying out the longitudinal force distribution ratio control (or the vertical force distribution ratio control) to the front and rear wheels in addition to the longitudinal force distribution ratio control to the right and left wheels. Furthermore, in the case of a front-wheel (or rear-wheel) drive vehicle, a prescribed stability factor can be achieved while maximizing the cornering power ka by carrying out the vertical force distribution ratio control of the front and rear wheels in addition to the longitudinal force distribution control of the right and left wheels.

As described above, according to the present invention, paying attention to the cornering powers of the right and left wheels, the vehicle state is controlled so that the representative value of these cornering powers is larger than the present value. It is difficult to individually increase the cornering power of each wheel, however, the cornering power can be increased as a whole of right and left wheels by carrying out the control described above. Accordingly, the response to the behavior variation can be made fast, and thus the steering stability of the vehicle under the traveling state such as cornering can be enhanced.

While the present invention has been disclosed in terms of the preferred embodiments in order to facilitate better understanding of the invention, it should be appreciated that the invention can be embodied in various ways without departing from the principle of the invention. Therefore, the invention should be understood to include all possible embodiments which can be embodied without departing from the principle of the invention set out in the appended claims.

Additionally, the disclosure of Japanese Patent Application No. 2003-166821 filed on Jun. 11, 2003 including the specification, drawing and abstract is incorporated herein by reference in its entirety.

What is claimed is:

1. A vehicle control device for controlling a motion state of a vehicle, comprising:
    a detecting unit for detecting action force containing longitudinal force, lateral force and vertical force acting on a wheel;
    a specifying unit for specifying a friction coefficient between the wheel and surface of a road;
    an estimating unit for estimating cornering power of each of right and left wheels based on the detected action force and the specified friction coefficient;
    a processing unit for determining a first control value so that a representative value of the cornering power concerning the right and left wheels which is calculated on the basis of the cornering power thus estimated is larger than a present value of the representative value of the cornering power concerning the right and left wheels; and
    a controlling unit for controlling a state of the vehicle based on the first control value thus determined.

2. The vehicle control device as claimed in claim 1, wherein the processing unit further determines a second control value so that a stability factor of the vehicle approaches a target stability factor, and the controlling unit further controls the state of the vehicle based on the second control value thus determined.

3. The vehicle control device as claimed in claim 2, wherein the processing unit determines the longitudinal force distribution ratio to front and rear wheels as the second control value, and the controlling unit further controls at least one of a driving force distribution ratio and braking force distribution ratio to the front and rear wheels so that the longitudinal force acting on the wheels satisfies the longitudinal force distribution ratio thus determined.

4. The vehicle control device as claimed in claim 2, wherein the processing unit determines an vertical force distribution ratio to the front and rear wheels as the second control value, and the controlling unit further controls a vertical load distribution ratio to the front and rear wheels so that the vertical force acting on the wheels satisfies the vertical force distribution ratio thus determined.

5. A vehicle control device for controlling a motion state of a vehicle, comprising:

a detecting unit for detecting action force containing longitudinal force, lateral force and vertical force acting on a wheel;

a specifying unit for specifying a friction coefficient between the wheels and surface of a road;

an estimating unit for estimating cornering power of each of right and left wheels based on the detected action force and the specified friction coefficient;

a processing unit for calculating a variation rate of the cornering power according to the action force on the basis of the estimated cornering power for each of the right and left wheels, and determining a first control value based on the calculated variation rate concerning the right and left wheels so that a variation rate concerning the left wheel and a variation rate concerning the right wheel approach to each other; and a controlling unit for controlling a state of the vehicle based on the first control value.

6. The vehicle control device as claimed in claim 5, wherein the processing unit calculates as the variation rate the variation rate of the cornering power based on the longitudinal force, and compares the calculated variation rates concerning the right and left wheels with each other to determine a longitudinal force distribution ratio to the right and left wheels as the first control value so that the longitudinal force acting on one wheel of the right and left wheels decreases and the longitudinal force acting on the other wheel increases, and the controlling unit controls at least one of a driving force distribution ratio and braking force distribution ratio to the right and left wheels so that the longitudinal force acting on the wheels satisfies the longitudinal force distribution ratio thus determined.

7. The vehicle control device as claimed in claim 6, wherein the variation rate concerning the one wheel is smaller than the variation rate concerning the other wheel.

8. The vehicle control device as claimed in claim 6, wherein the processing unit further determines a second control value so that a stability factor of the vehicle approaches a target stability factor, and the controlling unit further controls the state of the vehicle based on the second control value thus determined.

9. The vehicle control device as claimed in claim 8, wherein the processing unit determines the longitudinal force distribution ratio to front and rear wheels as the second control value, and the controlling unit further controls at least one of a driving force distribution ratio and braking force distribution ratio to the front and rear wheels so that the longitudinal force acting on the wheels satisfies the longitudinal force distribution ratio thus determined.

10. The vehicle control device as claimed in claim 8, wherein the processing unit determines an vertical force distribution ratio to the front and rear wheels as the second control value, and the controlling unit further controls a vertical load distribution ratio to the front and rear wheels so that the vertical force acting on the wheels satisfies the vertical force distribution ratio thus determined.

11. The vehicle control device as claimed in claim 5, wherein the processing unit calculates as the variation rate the variation rate of the cornering power based on the vertical force, and compares the calculated variation rates concerning the right and left wheels to determine a vertical force distribution ratio to the right and left wheels as the first control value so that the vertical force acting on one wheel of the right and left wheels decreases and the vertical force acting on the other wheel increases, and the controlling unit controls a vertical load distribution ratio to the right and left wheels so that the vertical force acting on the wheels satisfies the vertical force distribution ratio thus determined.

12. The vehicle control device as claimed in claim 11, wherein the variation rate concerning the one wheel is larger than the variation rate concerning the other wheel.

13. The vehicle control device as claimed in claim 5, wherein the processing unit further determines a second control value so that a stability factor of the vehicle approaches a target stability factor, and the controlling unit further controls the state of the vehicle based on the second control value thus determined.

14. The vehicle control device as claimed in claim 13, wherein the processing unit determines the longitudinal force distribution ratio to front and rear wheels as the second control value, and the controlling unit further controls at least one of a driving force distribution ratio and braking force distribution ratio to the front and rear wheels so that the longitudinal force acting on the wheels satisfies the longitudinal force distribution ratio thus determined.

15. The vehicle control device as claimed in claim 13, wherein the processing unit determines an vertical force distribution ratio to the front and rear wheels as the second control value, and the controlling unit further controls a vertical load distribution ratio to the front and rear wheels so that the vertical force acting on the wheels satisfies the vertical force distribution ratio thus determined.

16. A vehicle control method for controlling a motion state of a vehicle, comprising:
a first step of estimating cornering power of each of right and left wheels based on action force containing longitudinal force, lateral force and vertical force acting on a wheel and a friction coefficient between the wheel and surface of a road;
a second step of determining a first control value so that a representative value of the cornering power concerning the right and left wheels which is calculated on the basis of the cornering power thus estimated is larger than a present value of the representative value of the cornering power concerning the right and left wheels; and
a third step of controlling a state of the vehicle based on the first control value thus determined.

17. The vehicle control method as claimed in claim 16, wherein
said second step further includes a fourth step of determining a second control value so that a stability factor of the vehicle approaches a target stability factor, and
said third step further includes a fifth step of controlling the state of the vehicle based on the second control value thus determined.

18. The vehicle control method as claimed in claim 17, wherein
said fourth step includes a step of determining the longitudinal force distribution ratio to front and rear wheels as the second control value, and
said fifth step includes a step of controlling at least one of a driving force distribution ratio and braking force distribution ratio to the front and rear wheels so that the longitudinal force acting on the wheels satisfies the longitudinal force distribution ratio thus determined.

19. The vehicle control method as claimed in claim 17,
said fourth step includes a step of determining a vertical force distribution ratio to the front and rear wheels as the second control value, and
said fifth step includes a step of controlling a vertical load distribution ratio to the front and rear wheels so that the vertical force acting on the wheels satisfies the vertical force distribution ratio thus determined.

20. A vehicle control method for controlling a motion state of a vehicle, comprising:
a first step of estimating cornering power of each of right and left wheels based on action force containing longitudinal force, lateral force and vertical force acting on a wheel and a friction coefficient between the wheels and surface of a road;
a second step of calculating a variation rate of the cornering power according to the action force based on the estimated cornering power for each of the right and left wheels, and determining a first control value based on the calculated variation rate concerning the right and left wheels so that a variation rate concerning the left wheel and a variation rate concerning the right wheel approach to each other; and
a third step of controlling a state of the vehicle based on the first control value thus determined.

21. The vehicle control method as claimed in claim 20, wherein
said second step includes steps of calculating as the variation rate the variation rate of the cornering power based on the longitudinal force, and comparing the calculated variation rates concerning the right and left wheels with each other to determine a longitudinal force distribution rate to the right and left wheels as the first control value so that the longitudinal force acting on one wheel of the right and left wheel decreases and the longitudinal force acting on the other wheel increases, and
said third step includes steps of controlling at least one of a driving force distribution ratio and braking force distribution ratio to the right and left wheels so that the longitudinal force acting on the wheels satisfies the longitudinal force distribution ratio thus determined.

22. The vehicle control method as claimed in claim 21, wherein the variation rate concerning the one wheel is smaller than the variation rate concerning the other wheel.

23. The vehicle control method as claimed in claim 21, wherein
said second step further includes a fourth step of determining a second control value so that a stability factor of the vehicle approaches a target stability factor, and
said third step further includes a fifth step of controlling the state of the vehicle based on the second control value thus determined.

24. The vehicle control method as claimed in claim 23, wherein
said fourth step includes a step of determining the longitudinal force distribution ratio to front and rear wheels as the second control value, and
said fifth step includes a step of controlling at least one of a driving force distribution ratio and braking force distribution ratio to the front and rear wheels so that the longitudinal force acting on the wheels satisfies the longitudinal force distribution ratio thus determined.

25. The vehicle control method as claimed in claim 23,
said fourth step includes a step of determining a vertical force distribution ratio to the front and rear wheels as the second control value, and
said fifth step includes a step of controlling a vertical load distribution ratio to the front and rear wheels so that the vertical force acting on the wheels satisfies the vertical force distribution ratio thus determined.

26. The vehicle control method as claimed in claim 20, wherein
said second step includes steps of calculating as the variation rate the variation rate of the cornering power based on the vertical force, and comparing the calculated variation rates concerning the right and left wheels to determine a vertical force distribution ratio to the right and left wheels as the first control value so that the vertical force acting on one wheel of the right and left wheels decreases and the vertical force acting on the other wheel increases, and
said third step includes steps of controlling a vertical load distribution ratio to the right and left wheels so that the vertical force acting on the wheels satisfies the vertical force distribution ratio thus determined.

27. The vehicle control method as claimed in claim 26, wherein the variation rate concerning the one wheel is larger than the variation rate concerning the other wheel.

28. The vehicle control method as claimed in claim 20, wherein
said second step further includes a fourth step of determining a second control value so that a stability factor of the vehicle approaches a target stability factor, and
said third step further includes a fifth step of controlling the state of the vehicle based on the second control value thus determined.

29. The vehicle control method as claimed in claim 28, wherein
said fourth step includes a step of determining the longitudinal force distribution ratio to front and rear wheels as the second control value, and
said fifth step includes a step of controlling at least one of a driving force distribution ratio and braking force distribution ratio to the front and rear wheels so that the longitudinal force acting on the wheels satisfies the longitudinal force distribution ratio thus determined.

30. The vehicle control method as claimed in claim 28,
said fourth step includes a step of determining a vertical force distribution ratio to the front and rear wheels as the second control value, and
said fifth step includes a step of controlling a vertical load distribution ratio to the front and rear wheels so that the vertical force acting on the wheels satisfies the vertical force distribution ratio thus determined.

* * * * *